(12) United States Patent
Zhou

(10) Patent No.: US 9,088,148 B2
(45) Date of Patent: Jul. 21, 2015

(54) PROTECTION CIRCUIT FOR CENTRAL PROCESSING UNIT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Hai-Qing Zhou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 13 days.

(21) Appl. No.: 14/142,914

(22) Filed: Dec. 29, 2013

(65) Prior Publication Data

US 2014/0185173 A1 Jul. 3, 2014

(30) Foreign Application Priority Data

Dec. 29, 2012 (CN) .......................... 2012 1 05883187

(51) Int. Cl.
*H02H 5/04* (2006.01)
*H02H 1/00* (2006.01)

(52) U.S. Cl.
CPC ................................ *H02H 1/0007* (2013.01)

(58) Field of Classification Search
USPC ........................................................ 361/93.8
See application file for complete search history.

(56) References Cited

U.S. PATENT DOCUMENTS

| | | | | |
|---|---|---|---|---|
| 5,920,264 A | * | 7/1999 | Kim et al. ...................... | 340/584 |
| 6,335,577 B1 | * | 1/2002 | Baba .............................. | 307/28 |
| 7,245,099 B2 | * | 7/2007 | Yamamoto et al. ............ | 318/471 |
| 2010/0254058 A1 | * | 10/2010 | Kirchbaum et al. .......... | 361/103 |
| 2013/0027827 A1 | * | 1/2013 | Ge et al. ........................ | 361/93.8 |
| 2013/0044401 A1 | * | 2/2013 | Yeh et al. ...................... | 361/93.8 |

* cited by examiner

*Primary Examiner* — Dharti Patel
(74) *Attorney, Agent, or Firm* — Novak Druce Connolly Bove + Quigg LLP

(57) ABSTRACT

A protection circuit for a central processing unit (CPU) includes a power circuit, two comparators, a number of resistors, a thermistor, and an electronic switch. A non-inverting input terminal of the comparator is coupled to a first power terminal. An inverting input terminal of the comparator is connected to ground through the thermistor. An output terminal of the comparator is coupled to the electronic switch. When an operation temperature of the CPU exceeds a predefined temperature, the comparator enables the electronic switch to be turned on, to reduce an operation frequency of the CPU.

8 Claims, 1 Drawing Sheet

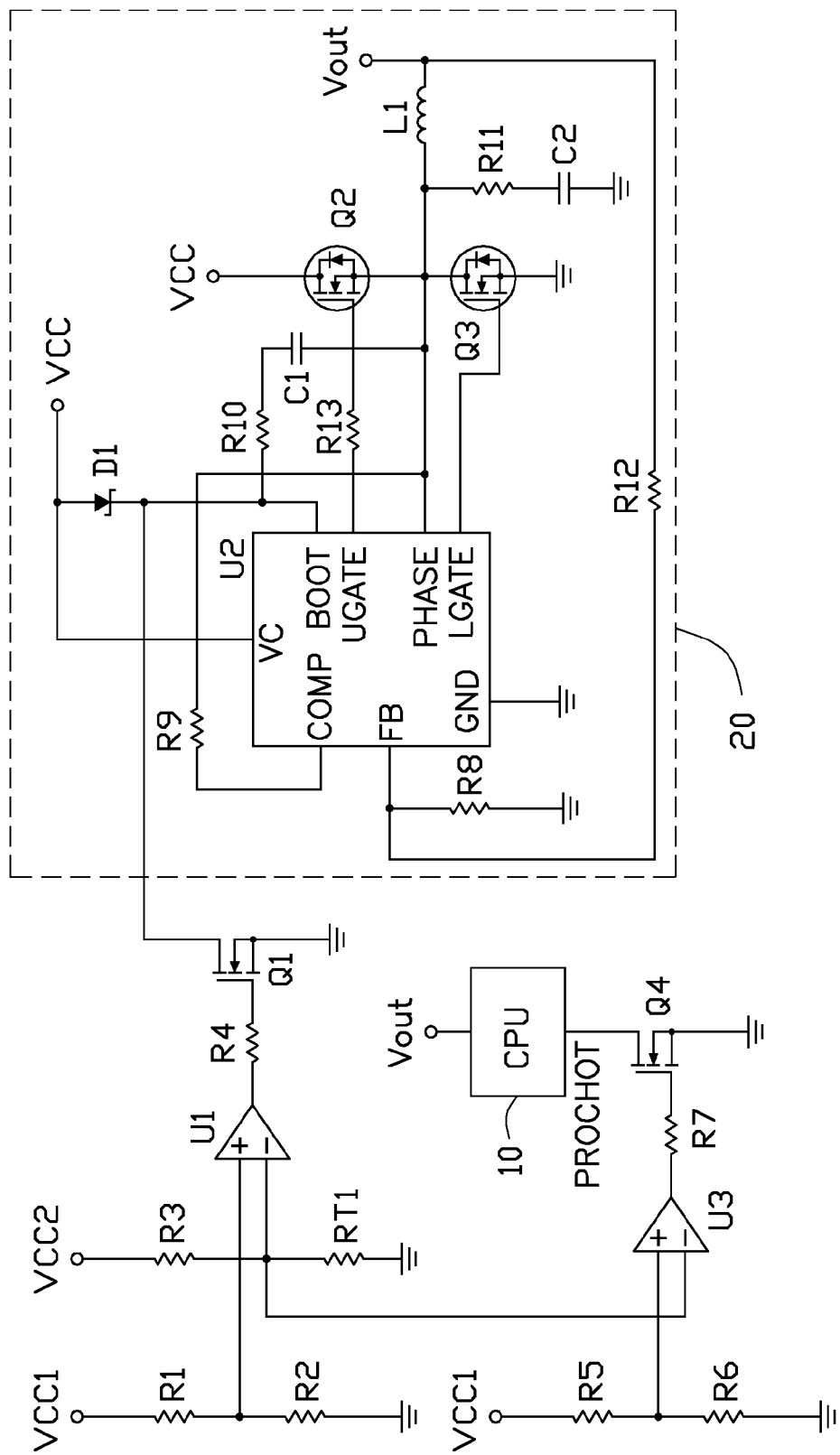

PROTECTION CIRCUIT FOR CENTRAL PROCESSING UNIT

BACKGROUND

1. Technical Field

The present disclosure relates to protection circuits, and particularly to an over-heat protection circuit for a central processing unit (CPU).

2. Description of Related Art

A service life of an electrical component, such as a CPU, is influenced by an operation temperature of the electrical component. However, the higher the frequency the electrical component operates, the more heat the electrical component generates, thereby reducing the service life of the electrical component.

Therefore, there is room for improvement in the art.

BRIEF DESCRIPTION OF THE DRAWING

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

The FIGURE is a circuit diagram of an embodiment of a protection circuit.

DETAILED DESCRIPTION

The disclosure is illustrated by way of example and not by way of limitation in the FIGURES of the accompanying drawings in which like references indicate similar elements. It should be noted that references to "an" or "one" embodiment in this disclosure are not necessarily to the same embodiment, and such references mean "at least one."

The FIGURE illustrates an embodiment of a protection circuit. The protection circuit is used to protect a central processing unit (CPU) 10 from overheating. In one embodiment, the CPU 10 comprises a heat protection pin PROCHOT. A frequency of the CPU 10 is reduced when the heat protection pin PROCHOT is at a low-voltage level, such as logic 0.

The protection circuit comprises thirteen resistors R1-R13, four metal-oxide semiconductor field-effect transistors (MOSFETs) Q1-Q4, an inductor L1, two comparators U1 and U3, a pulse width modulation (PWM) controller U2, two capacitors C1 and C2, a Zener diode D1, and a thermistor RT1. The PWM controller U2, the resistors R8-R13, the MOSEFTs Q2 and Q3, the inductor L1, and the capacitor C1 cooperatively form a power circuit 20. The power circuit 20 provides power for the CPU 10.

A non-inverting input terminal of the comparator U1 is coupled to a power terminal VCC1 through the resistor R1, and is grounded through the resistor R2. An inverting input terminal of the comparator U1 is coupled to a power terminal VCC2 through the resistor R3, and is grounded through the thermistor RT1. The inverting input terminal of the comparator U1 is coupled to an inverting input terminal of the comparator U3. An output terminal of the comparator U1 is coupled to a gate of the MOSFET Q1 through the resistor R4. A non-inverting input terminal of the comparator U3 is coupled to the power terminal VCC1 through the resistor R5, and is grounded through the resistor R6. An output terminal of the comparator U3 is coupled to a gate of the MOSFET Q4 through the resistor R7. A source of the MOSFET Q4 is grounded. A drain of the MOSFET Q4 is coupled to the heat protection pin PROCHOT.

A source of the MOSFET Q1 is grounded. A drain of the MOSFET Q1 is coupled to a control pin BOOT of the PWM controller U2. The control pin BOOT of the PWM controller U2 is coupled to a cathode of the Zener diode D1 and a phase output pin PHASE through the resistor R10 and the capacitor C1 in that order. An anode of the Zener diode D1 is coupled to a power terminal VCC. A power pin VC of the PWM controller U2 is coupled to the power terminal VCC. A comparison pin COMP of the PWM controller U2 is coupled to the phase output pin PHASE through the resistor R9. The phase output pin PHASE of the PWM controller U2 is coupled to a first terminal of the inductor L1, and grounded through the resistor R11 and the capacitor C2 in that order. A feedback pin FB of the PWM controller U2 is grounded through the resistor R8, and coupled to a second terminal of the inductor L1 through the resistor R12. An up gate output pin UGATE of the PWM controller U2 is coupled to a gate of the MOSFET Q2 through the resistor R13. A source of the MOSFET Q2 is coupled to the phase output pin PHASE of the PWM controller U2. A drain of the MOSFET Q2 is coupled to the power terminal VCC. A ground pin GND of the PWM controller U2 is grounded. A low gate output pin LGATE is coupled to a gate of the MOSFET Q3. A source of the MOSFET Q3 is grounded. A drain of the MOSFET Q3 is coupled to the phase output pin PHASE of the PWM controller U2.

In the embodiment, when the control pin BOOT is at a high-voltage level, such as logic 1, the PWM controller U2 outputs a voltage Vout through the phase output pin PHASE and the inductor L1, to provide power for the CPU 10. When the control pin BOOT is at a low-voltage level, such as logic 0, the PWM controller U2 does not output voltage through the phase output pin PHASE. In one embodiment, the thermistor RT1 is a positive temperature coefficient resistor.

When the CPU 10 operates at room temperature, a voltage of the non-inverting input terminal of the comparator U1 is less than a voltage of the inverting input terminal of the comparator U1 by setting suitable resistances of the resistors R1 and R2, and a voltage of the non-inverting input terminal of the comparator U3 is less than a voltage of the inverting input terminal of the comparator U3 by setting suitable resistances of the resistors R5 and R6. Accordingly, the output terminals of the comparators U1 and U3 output a low-voltage level control signals, which causes the MOSFETs Q1 and Q4 to turn off. Thus, the heat protection pin PROCHOT is at a high-voltage level, and the CPU 10 operates at a normal frequency.

If an operation temperature of the CPU 10 exceeds a first predefined temperature, a resistance of the thermistor RT1 is reduced, and voltages of the inverting input terminals of the comparators U1 and U3 are reduced correspondingly. Accordingly, the voltage of the non-inverting input terminal of the comparator U3 is greater than the voltage of the inverting input terminal of the comparator U3, so the output terminal of the comparator U3 outputs a high-voltage level control signal to the gate of the MOSFET Q4, which causes the MOSFET Q4 to turn on. Thus, the heat protection pin PROCHOT receives a low-voltage level, and the operation frequency of the CPU 10 is reduced correspondingly, so as to generate less heat.

If the operation temperature of the CPU 10 exceeds a second predefined temperature, which is greater than the first predefined temperature, the resistance of the thermistor RT1 is further reduced. When the voltage of the non-inverting input terminal of the comparator U1 is greater than the voltage of the inverting input terminal of the comparator U1, the output terminal of the comparator U1 outputs a high-voltage level control signal, and the gate of the MOSFET Q1 is at high-voltage level. Thus, the MOSFET Q1 is turned on, the voltage of the control pin BOOT is at a low-voltage level, and the PWM controller U2 does not output voltage to the CPU 10. Accordingly, the CPU 10 stops operating.

In the embodiment, the transistors Q1-Q4 are n-channel nMOSFETs. In other embodiments, the transistors Q1-Q4 can be replaced by other electronic switches, such as bipolar junction transistors.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A protection circuit, comprising:
   a central processing unit (CPU) comprising a heat protection pin, wherein when the heat protection pin is at a low-voltage level, an operation frequency of the CPU is reduced;
   a first resistor;
   a thermistor;
   a first electronic switch comprising a first, second, and third terminal; and
   a first comparator comprising an inverting input terminal, a non-inverting input terminal, and an output terminal;
   wherein the non-inverting input terminal of the first comparator is coupled to a first power terminal, the inverting terminal of the first comparator is connected to ground through the thermistor, and is coupled to a second power terminal through the first resistor; the output terminal of the first comparator is coupled to the first terminal of the first electronic switch; the second terminal of the first electronic switch is connected to ground, the third terminal of the first electronic switch is coupled to the heat protection pin of the CPU; when the first terminal of the first electric switch is at a high-voltage level, the second terminal of the first electronic switch is connected to the third terminal of the first electronic switch, when the first terminal of the first electronic switch is at a low-voltage level, the second terminal of the first electronic switch is disconnected from the third terminal of the first electronic switch; and
   wherein when the operation temperature of the CPU exceeds a first predefined temperature, the voltage of the inverting input terminal of the first comparator is greater than the voltage of the non-inverting input terminal of the first comparator, and the output terminal of the first comparator outputs a high-voltage level control signal to the first terminal of the first electronic switch.

2. The protection circuit of claim 1, further comprising a second comparator, a second electronic switch, and a pulse width modulation (PWM) controller outputting a voltage to the CPU, wherein a non-inverting input terminal of the second comparator is coupled to a third power terminal, an inverting input terminal is coupled to a node between the first resistor and the thermistor, and an output terminal of the second comparator is coupled to a first terminal of the second electronic switch; a second terminal of the second electronic switch is connected to ground, and a third terminal of the second electronic switch is coupled to a control pin of the PWM controller; when the first terminal of the second electronic switch is at a high-voltage level, the second terminal of the second electronic switch is connected to the third terminal of the second electronic switch; when the first terminal of the second electronic switch is at a low-voltage level, the second terminal of the second electronic switch is disconnected from the third terminal of the second electronic switch; when the operation temperature of the CPU exceeds a second predefined temperature greater than the first predefined temperature, a voltage of the non-inverting input terminal of the second comparator is greater than a voltage of the inverting input terminal of the second comparator, the output terminal of the second comparator outputs a high-voltage control signal, the second electronic switch is turned on, the control pin of the PWM controller is at low-voltage level, and the PWM controller does not output voltage.

3. The protection circuit of claim 2, further comprising a Zener diode, wherein the control pin of the PWM controller is coupled to a cathode of the Zener diode, and an anode of the Zener diode is coupled to a fourth power terminal.

4. The protection circuit of claim 3, further comprising a second resistor and a third resistor, wherein the output terminal of the first comparator is coupled to the first terminal of the first electronic switch through the second resistor, and the output terminal of the second comparator is coupled to the first terminal of the second electronic switch through the third resistor.

5. The protection circuit of claim 4, further comprising a fourth resistor and a fifth resistor, wherein the non-inverting input terminal of the first comparator is coupled to the first power terminal through the fourth resistor, and is connected to ground through the fifth resistor.

6. The protection circuit of claim 5, further comprising a sixth resistor and a seventh resistor, wherein the non-inverting input terminal of the second comparator is coupled to the third power terminal through the sixth resistor, and is connected to ground through the seventh resistor.

7. The protection circuit of claim 6, wherein the first and second electronic switches are n-channel metal semiconductor oxide field effect transistors (nMOSFETs), the first terminals, the second terminals, and the third terminals of the first and second electronic switches are gates, sources, and drains of the nMOSFETs, respectively.

8. The protection circuit of claim 7, wherein the thermistor is a positive temperature coefficient resistor.

* * * * *